United States Patent
Skyum et al.

(10) Patent No.: US 10,718,656 B2
(45) Date of Patent: Jul. 21, 2020

(54) SUSPENSION FOR A WEIGHING CELL (71) Applicant: Scanvaegt Systems A/S, Aarhus N (DK)

(72) Inventors: Henrik Skyum, Hadsten (DK); Bo Müller Hansen, Lystrup (DK)

(73) Assignee: Scanvaegt Systems A/S, Aarhus N (DK)

( * ) Notice: Subject to any disclaimer, the term of this patent is extended or adjusted under 35 U.S.C. 154(b) by 167 days.

(21) Appl. No.: 15/922,986

(22) Filed: Mar. 16, 2018

(65) Prior Publication Data
US 2018/0266875 A1 Sep. 20, 2018

(30) Foreign Application Priority Data
Mar. 16, 2017 (DK) .................... 2017 70187

(51) Int. Cl.
| G01G 21/24 | (2006.01) |
| G01G 3/14 | (2006.01) |
| G01G 13/02 | (2006.01) |
| G01G 21/22 | (2006.01) |

(52) U.S. Cl.
CPC ........... G01G 21/22 (2013.01); G01G 3/1412 (2013.01); G01G 13/02 (2013.01); G01G 21/244 (2013.01)

(58) Field of Classification Search
CPC ...... G01G 21/22; G01G 13/02; G01G 3/1412; G01G 21/244
USPC ........................................................ 177/225
See application file for complete search history.

(56) References Cited

U.S. PATENT DOCUMENTS

| 3,782,485 A * | 1/1974 | Weickhardt ............ G01G 23/02 177/157 |
| 4,196,784 A * | 4/1980 | Suzuki ................. G01G 3/1412 177/211 |
| 4,300,645 A | 11/1981 | Sly |
| 4,662,464 A | 5/1987 | Nomura |
| 4,666,006 A * | 5/1987 | Wernimont ............ G01G 21/23 177/211 |
| 4,872,522 A | 10/1989 | Kunz |

(Continued)

FOREIGN PATENT DOCUMENTS

| AU | 2014200699 | * 8/2015 |
| EP | 0016238 A1 | 10/1980 |

(Continued)

*Primary Examiner* — Jacques M Saint Surin
(74) *Attorney, Agent, or Firm* — James Creighton Wray (57) ABSTRACT

Suspension for a weighing cell, where the suspension comprises a base structure and a moveable structure, and where a load cell is interposed and connected between said base structure and said moveable structure, where the suspension is generally shaped as a parallelogram, said parallelogram having two parallel primary elements, where one primary element is fastened to the base structure and the other primary element is fastened to the moveable structure, and where between the primary elements on respectively the base structure and the moveable structure, two in a rest position parallel secondary elements are arranged, where each secondary element is provided with at least one bendable section, said bendable sections having the same characteristics with respect to bending, and that the primary elements comprises a cylindrical section and a fastening land in either end of the cylindrical section for fastening an end of the secondary elements.

14 Claims, 5 Drawing Sheets

(56) References Cited

U.S. PATENT DOCUMENTS

| | | | |
|---|---|---|---|
| 5,262,598 A | 11/1993 | Stotler | |
| 5,929,390 A * | 7/1999 | Naito | G01G 3/1412 |
| | | | 177/211 |
| 6,472,618 B1 * | 10/2002 | Izumo | G01G 7/02 |
| | | | 177/210 EM |
| 9,423,289 B2 * | 8/2016 | Johnson | G01G 23/005 |
| 9,470,574 B2 * | 10/2016 | Lawn | G01G 19/021 |
| 2006/0016270 A1 | 1/2006 | Cavenago | |
| 2016/0084698 A1 * | 3/2016 | Kontschak | G01G 19/18 |
| | | | 177/263 |

FOREIGN PATENT DOCUMENTS

| | | | | |
|---|---|---|---|---|
| EP | 0452957 A1 | | 10/1991 | |
| GB | 2188737 A | | 10/1987 | |
| GB | 2229823 A | * | 3/1990 | G01G 3/12 |
| WO | WO2015117197 | * | 8/2015 | G01G 19/02 |

* cited by examiner

SUSPENSION FOR A WEIGHING CELL

FIELD OF THE INVENTION

The present invention relates to a weighing cell, and particularly to a weighing cell comprising a suspended loading cell which loading cell is suspended between a base structure and a movable structure onto which the objects to be weighed are placed.

BACKGROUND OF THE INVENTION

In a lot of processes it is necessary to weigh the items being processed as they are being processed which means that it is necessary to continuously weigh products, objects or items as they pass for example on a conveyor.

In other processes it is necessary or desirable to weigh the items batch-wise or as singles or in a stepwise manner, for these purposes the weighing apparatus' may be used as stand-alone units.

In the art numerous devices are available. It is, however, important to select a suitable weighing device depending on the speed with which the items to be weighed passes the weighing installation and also the weight of the objects which are to be weighed and furthermore which weighing tolerances can be accepted during the weighing procedure. A proven constructional principle in this connection is to connect the part of the weighing device which is influenced by the weight of objects passing for example on a conveyor to the base or non-movable part by a parallelogram. The parallelogram provides a very stiff construction yet a construction which is suitable to in very controlled manner move slightly but consistently and potentially linearly under the influence of loads.

Examples of devices incorporating a parallelogram in the construction of the weighing cell are for example disclosed in EP 1564534 and EP 3021094. Common for both these devices and for many other devices in the art is the fact that in order to obtain the necessary precise weighing results the components from which the apparatus is made needs to be made very precisely. Particularly in the prior art it is common routine to machine the part of the weighing device incorporating the parallelogram in order to obtain a substantially 100% parallel construction such that as the movable part moves relatively to the base part it is ensured that this movement will occur in a perfect parallelogrammic movement.

One such example is mentioned as prior art in U.S. Pat. No. 4,662,464, where a parallelogrammic weighing system is described. The system comprises two parallelograms each having a separate (vertical) post (3a, 3b). Each vertical post is connected in either end by (horizontal) leaf springs to a vertical link. The vertical link is common for both parallelograms. The vertical link is a machined monolith, providing fastening for the four ends of the leaf springs, and (approximate) equal spacing both for the adjacent leaf springs and for the upper and lower leaf springs.

Equal spacing and thereby perfect parallelograms are a pre-requisite for precise weight measurements. A disadvantage of this construction is the many parts from which it is assembled. This problem is addressed in the invention of U.S. Pat. No. 4,662,464 by providing a machined monolith structure in both ends of the flexible (horizontal) elements. Although by adequate and expensive machining this construction may overcome the shift-problems described and other inaccuracies for these types of weighing devices, the costs involved in achieving the desired accuracies (very low tolerances) is extremely high.

OBJECT OF THE INVENTION

Machining parts to the degree needed, i.e. with minimal tolerances is very expensive, particularly due to the size of the objects and apparatus parts needed to construct a weighing cell of a certain size incurs very high costs and as such the resulting cost of the finished weighing cell is relatively high. Consequently, it is an object of the present invention to address this by providing a weighing cell construction having increased precision and accuracy at a lower cost. These and other advantages are achieved with the present invention.

DESCRIPTION OF THE INVENTION

The invention addresses this by providing a suspension for a weighing cell, where the suspension comprises a base structure and a moveable structure, and where a load cell is connected between said base structure and said moveable structure, where the suspension is generally shaped as a parallelogram, said parallelogram having two parallel primary elements, where one primary element is fastened to the base structure and the other primary element is fastened to the moveable structure, and where between the primary elements on respectively the base structure and the moveable structure, two, in a rest position parallel secondary elements are arranged, where each secondary element is provided with at least one bendable section, said bendable sections having the same characteristics with respect to bending, and that the primary elements comprises a cylindrical section and a fastening land in either end of the cylindrical section for fastening an end of the secondary elements, wherein two parallelograms are provided, such that the secondary parallel elements of each parallelogram are parallel, and that the primary elements of the movable structure and the base structure are arranged on parallel lines orthogonal to said secondary parallel elements, and where the parallelograms are connected by at least one plate element.

Although it is foreseen that the primary elements shall be machined in both ends, it is substantially cheaper to machine the primary elements, typically being a solid or hollow cylinder suggested in a further advantageous embodiment than machining the entire parallelogrammic section. Furthermore the primary elements can be manufactured with extremely small or negligible tolerances, thereby providing the possibility for very accurate movement of the parallelograms and thereby precise weighing. Furthermore as the process of providing the improved accurate construction, by way of the primary elements, also a relatively cheaper construction is made available, as compared to a weighing device exhibiting corresponding weighing accuracies.

The flexibility, i.e. the facility of allowing the movable section to move relative to the base section is provided by the secondary parallel elements which are provided with bendable sections such that the relative movement between the primary elements of the movable structure and the base structure is controlled by these bendable sections.

The term "cylindrical" shall be understood in its scientific/geometric meaning such that it is a circumference generated by a straight line moving without change of direction orthogonal to said circumference and describing with its end any fixed curve. Examples of cross-sections having a cylindrical cross-section are circle, oval, quadratic, rectangular, triangular or any other random geometric shape.

For the cylindrical sections it is important that both ends/fastening lands of each section are parallel. The shape and geometry between the ends is of lesser importance, with respect to achieving the perfect parallelogram structure.

The primary elements are provided with plate members (fastening lands) in either end of the primary elements such that the thickness of the plate element in either end together with the length of the primary element determines the entire length of the movable structure and the base structure. As plates may be manufactured to very fine tolerances the assembly of plates and primary elements may be carried out with extremely low tolerances such that these sides of the parallelogram have exactly the same length.

Naturally the secondary elements may also be fastened directly to the ends of the primary elements, i.e. between the plate elements and the fastening lands/ends of the primary elements. In this manner any inaccuracies in the plate elements' thicknesses are eliminated with respect to the parallelogram geometry.

In a further embodiment the primary elements are fastened to the fastening land on the same side of the fastening land as the secondary elements. In this embodiment the accuracy is further improved as the variation in thickness of the plate from which the fastening land is manufactured is not relevant, but rather the planeness of the plate. The closer to the primary land the secondary member is fastened, the less chance of inaccuracies is achieved.

Furthermore, using cylindrical primary elements manufactured or machined from a cylindrical stay, bar or rod is a very inexpensive manner in which to obtain high precision, and high strength both with respect to normal and bending forces. Furthermore, as the primary elements may be manufactured very precisely, it is also relatively easy and inexpensive to select the height of the parallelogram (i.e. the length of the primary elements) according to choice in the particular application.

The parallel, secondary elements are made from at straight leaf spring element as discussed in a further embodiment of the invention. Also these straight leaf spring elements are able to be machined to very fine tolerances, and when mounted to the end plates/fastening lands provided in either end of the primary elements, a perfect parallelogram may be constructed.

In order to control the bending action due to the weight of an object being placed on the movable section the secondary parallel element may be provided with stiffening plates in order to minimize the actual movement of the movable structure relative to the base structure.

In the art load cells are able to detect very small movements and translate this to input to a calculating unit which based on the relative small movement may provide a very precise weight indication.

In a further advantageous embodiment the leaf spring elements may also be provided as two leaf spring elements in each secondary element as disclosed in a further advantageous embodiment where each leaf spring element is fastened to respective primary elements in one end and in the other end connected by a stiffening plate. With the embodiment it becomes possible to vary the resistance created by the spring element such that the suspension may be adapted to various loads or uses by exchanging the spring elements in one or both ends of the stiffening element.

In a further advantageous embodiment two parallelograms are provided such that the secondary parallel elements of each parallelogram are parallel, and that the primary elements of the movable structure and the base structure are arranged on parallel lines orthogonal to said secondary parallel elements.

With this construction it becomes possible to provide a more stable foundation for the part of the weighing cell which is in contact with the surface on which the objects to be weighed are passing or placed. At the same time, by providing the load cell between the two parallelograms it is only necessary to provide one load cell.

The physical position of the load cell may of cause be outside the parallelogram(s) as long as the load cell is connected such that it will be influenced by the relative movement between the fixed or stationary base part and the moveable structure. It is also contemplated that more load cells may be connected between the moveable structure and the base part.

The leaf springs corresponding to the movable structure's resistance against the movement relative to the base structure may naturally be adapted to the fact that there are now eight bendable sections whereas the construction only including one parallelogram has only four bendable sections.

In order to provide a stable structure the suspension comprises two parallel parallelograms where each parallelogram comprises two primary elements and two secondary elements, and where the plate at least in one end of the primary element of a first parallelogram connects to an end of adjacent primary elements.

The common plate element, particularly in a further embodiment where the plate element is bent in order to achieve a higher moment of resistance/inertia a very stiff structure is achieved which is being built up by elements needing very little machining in order to achieve very precise components and which may be assembled to very high specifications with negligible tolerances, and at the same time due to the bend in the plate and the plate structure itself provides a very stiff and reliable structure. The common plate element naturally fixates the two parallelograms with respect to each other such that it is only the plate element's elasticity that may give rise to inaccuracies between the parallel arrangement of the two parallelograms.

In practice, it is possible to provide the common plate elements as nearly identical members and for all practical purposes as entirely stiff elements, such that the parallel arrangement of the two parallelograms is ensured.

In a still further advantageous embodiment the distance between the upper surface and the lower surface of the moveable structure and the base structure is between 20 and 400 mm, more preferred between 50 mm and 120 mm. It is clear that the larger the distance between the upper surface and the lower surface, i.e. corresponding to the length of the primary element plus the plate thickness is determining for the accuracy of the measurements.

The longer the distance, the better accuracy due to the fact that the forces acting on the secondary parallel elements provide a more true bending to the bending sections whereas the forces in the plane of the secondary parallel elements are higher, the shorter the distance. However, for practical reasons and in order to be able to incorporate suspension systems for weighing cells with this construction, the practical construction height will typically be in the range of 20-400 millimeters.

In a still further advantageous embodiment the leaf spring element has a length spanning the distance between the two parallel primary elements, a width, and a thickness orthogonal to a plane defined by said length and width, where the thickness is in the range of 0.1 mm to 5 mm more preferred between 0.2 mm to 1.2 mm and most preferred 0.3 mm. The spring element is determining the movable structure's ability to move relative to the base structure and will therefore be selected such that a consistent and relatively small movement is obtained, naturally depending on the weight of the items to be weighed by the system, but movements of the movable structure with respect to the base structure shall be sufficient in order for the load cell to register the weight of the items passing the load cell and thereby the suspension in a reliable and consistent manner.

In still further embodiments the weighing cell foundation is mounted to the suspension by legs, and where at least one leg or more preferred two legs are coaxially arranged with respect to one or more primary elements or where the two legs are coaxially arranged with respect to two primary elements arranged on separate parallelograms. Where only one leg is connected to the suspension coaxially with the primary elements an uneven distribution of load may occur. Therefore by arranging two legs coaxially with the primary elements a perfect load distribution is achieved. Furthermore the strength of the weighing cell foundation may also be reduced as the construction as such is not subjected to bending, but the legs will transfer the load directly to the parallelograms.

DESCRIPTION OF THE DRAWING

The invention will now be described with reference to the accompanying drawings wherein.

DETAILED DESCRIPTION OF THE INVENTION

Figure 1:
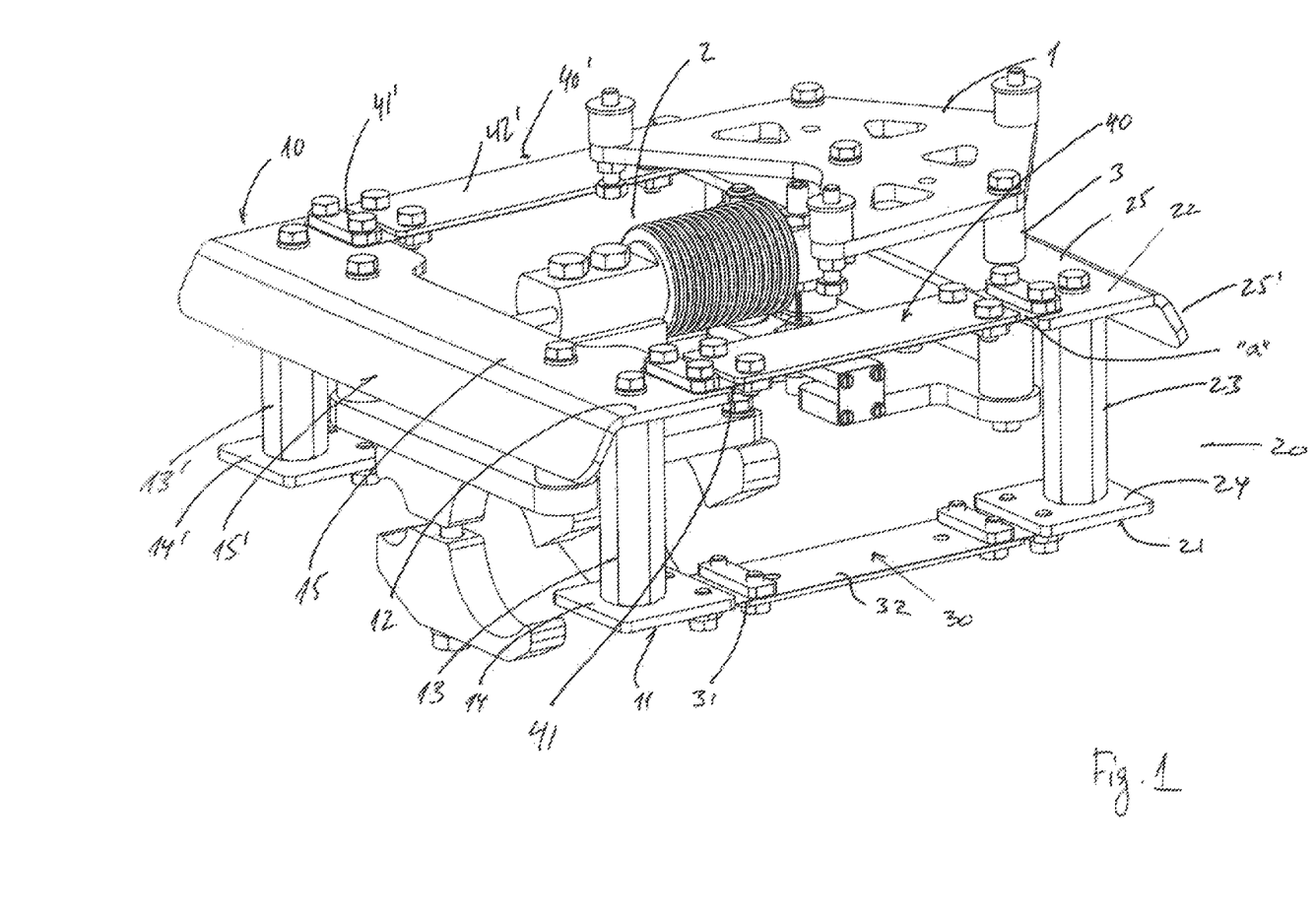
FIG. 1 illustrates a suspension for a weighing cell

In FIG. 1 is illustrated a suspension for a weighing cell. As discussed above weighing cells are used in production lines to continuously register the weight of a wide range of products passing for example on a conveyor past the weighing cell.

The conveyor is typically mounted on a weighing cell foundation 1. The weighing cell foundation 1 is connected to a load cell 2. The suspension for the weighing cell comprises a base structure 10 as well as a movable structure 20. When the weighing cell foundation is depressed due to a product passing on the conveyor connecting to the weighing cell foundation 1, the movable structure 20 will move relative to the base structure 10.

Typically, the base structure 10 is fixed, for example to the structure of the production facility, i.e. the conveyor's substructure (not illustrated).

The load cell 2 is consequently interposed between the movable structure 20 and the base structure 10 in order to be able to register the weight of the products passing on the conveyor belt connected to the weighing cell foundation 1. The weight of an object causes the movable part 20 to move (downwards) relative to the base structure 10.

In order to achieve a reliable substantially linear progression of the input to the load cell, i.e. the result of the weight of objects passing on the conveyor, it is desirable to be able to create a structure which has linear characteristics such that the correct input is passed to the load cell whether it is a very light object or a relatively heavy object passing the weighing cell foundation 1. In order to achieve this, the movable structure 20 is connected to the base structure by two substantially parallel secondary elements 30, 40.

The secondary parallel elements 30, 40 in combination with the base structure 10 and the movable structure 20 in this manner forms a parallelogram.

In order to obtain the very precise measurements which are necessary with these types of weighing modules/weighing cells it is necessary to ensure that the parallelogram is absolutely parallel which requires that the movable part 20 and the base structure 10 both has the same fixed length between the upper and lower surfaces 11, 12, 21, 22 respectively.

In the illustrated embodiment depicted in FIG. 1 the distance between the lower and upper surfaces 11, 12, 21, 22 is achieved by providing a primary element 13, 23 having a fixed length. As the primary elements 13, 23 in the illustrated embodiment are solid or hollow cylinders, it is possible to machine these such that they have a very precise length whereby the primary elements 13, 23 are identical. By furthermore providing the lower and upper surfaces 11, 12, 21, 22 as plate elements 14, 15, 24, 25 the distance between the upper surface 22, 12 and the lower surfaces 21, 11 will be substantially identical, and the only tolerance will be the tolerance of the plate material from which the plate elements 14, 15, 24, 25 are manufactured, or even smaller as will be explained with reference to FIG. 4.

Typically, the tolerances for these types of plate materials are very, very small, i.e. less than a tenth of a millimetre, and consequently the distances between the upper and lower surfaces of the movable structure 20 and the base structure 10 is exactly the same. Any inconsistencies may be adjusted when mounting the secondary parallel elements 30, 40 as will be explained below.

In order to achieve the perfect parallelogram the attachment points for the secondary parallel elements 30, 40 to the plate elements 14, 15, 24, 25 of the movable respective the base structure 20, 10 must be such that when assembled the primary elements 13, 23 are exactly parallel in the situation where the entire assembly is unloaded.

In order to ensure the exact parallel arrangement of particularly the secondary elements very thin shims are typically used to adjust the parallel arrangement of the members. As the primary elements 13, 23 easily may be manufactured to very precise exact lengths, with only minimal tolerances, and the plate members likewise has very small thickness variations, the operation of adjusting the exact parallel configuration by fitting shims between the secondary elements fastening points to the primary elements is very often not necessary and if necessary quickly handled.

Furthermore, the manufacture of primary elements 13, 23, for example in the shape of pipe lengths, is substantially less costly than any machining process, and will even provide improved precision.

The secondary parallel elements each comprise a flexible element 31, 41 where each of the flexible elements 31, 41 in either end is attached to the plate elements 14, 24, 15, 25 such that the secondary parallel elements 30, 40 are attached to the primary elements 13, 23. The flexible elements 31, 41 will when the weighing cell foundation is loaded with an object passing on the conveyor press the movable structure 20 downwards whereby the flexible element will pivot slightly in the vicinity of the attachment points to the plate elements, but in such a manner that the primary elements 13, 23 and the secondary parallel elements 30, 40 will still constitute a parallelogram.

The flexible elements 31, 41 are in this embodiment stiffened by a stiffening plate 32, 42 such that only a short distance "a" is free in both ends of the secondary parallel elements 30, 40 of the flexible element 31, 41. In this manner by providing the stiffening plates 32, 42 it is possible to adjust the stiffness of the parallelogram and thereby the amount of movement desirable for the weighing cell and particularly how much movement is passed on to the load cell 2.

In order to ensure that the parallelogram is constituted by absolutely parallel sides the distance in either end of the flexible elements may be measured. If there is a difference, this difference may be equalized by inserting levelling plates in one end of the secondary parallel elements 30, 40, where these are attached as indicated in the illustrative embodiment by bolts onto the plate elements 14, 15, 24, 25 in order to ensure that also the secondary parallel elements are arranged in a strict parallel orientation.

When the movable structure 20 is depressed due to a load being exerted on the weighing cell foundation 1 only the small sections "a" of the flexible element will be able to deform as the rest of the flexible elements 31, 41 is stiff due to the provision of the stiffening plates 32, 42. In this manner the parallelogram is maintained during use.

In the illustrated embodiment of the invention as depicted in FIG. 1 the construction comprises two parallelograms arranged in parallel such that the second parallelogram is connected to the first parallelogram by the plate element 15. The second parallelogram is in construction completely identical to the first parallelogram, i.e. that it comprises primary elements 13' of exactly the same length as the primary elements in the first parallelogram connected to plate element 14' and the common plate element 15.

Furthermore, the secondary parallel element 40', 30' (only 40' is visible) is constructed in exactly the same manner as the first secondary parallel elements 30, 40, i.e. having a flexible element 41' stiffened by a stiffening element 42'. In this manner the two parallelograms will operate in exactly the same manner and it is possible to arrange the load cell 2 centrally between the two parallelograms such that a true reading is conveyed from the weighing cell foundation 1 to the load cell.

In this embodiment the plate elements 15, 25 are provided with a bent section 15', 25'. The bent section 15, 25 is bent such that improved stiffness is provided orthogonal to the flexible elements 31,41, in order to provide stiffness to the construction such that the load transferred from the weighing cell foundation 1 through the legs 3 of the weighing cell foundation to the upper surface 22 of the plate element 25 is not exposed or causing bending during transmission of the load of the movable structure 20 and thereby to the flexible elements 31, 41. As everything is stiff apart from the flexible elements 31, 41 the load provided on the weighing cell foundation will be evenly distributed between the two parallelograms and as such the load cell 2 will be evenly influenced.

It is however clear that where the distance between the two parallelograms are relatively large compared to the weight of the object, one or the other of the parallelograms may be more influenced—an uneven influence is transmitted to the parallelograms and thereby to the moveable structure. This is in large part compensated by the stiffness of the construction (achieved to a degree by the bent sections) and the arrangement of the loading cell, such that a true measure is obtained.

Figure 2:
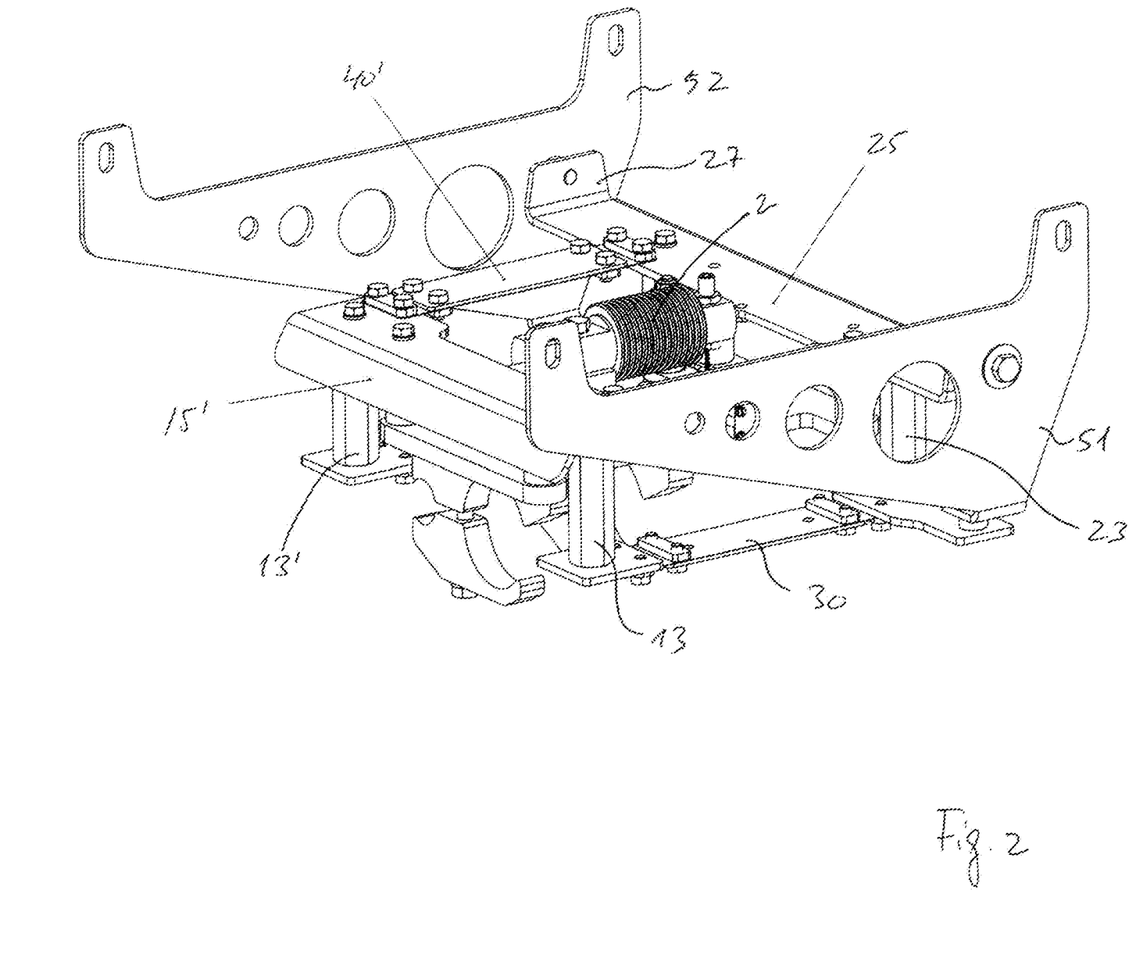
FIG. 2 illustrates a further variation of a weighing cell construction

In FIG. 2 is illustrated a completely analogous weighing cell as described above with reference to FIG. 1 only the weighing cell foundation 1 is in this embodiment substituted by a cradle comprising two frame parts 51, 52, which cradle parts 51, 52 are connected to flange sections 27 provided on the plate element 25. The parallelograms are arranged in the same manner and are constructed in the same manner in order to achieve the precise length of the primary elements and the secondary parallel elements 30, 40 such that as was the case for the embodiment of the invention described above with reference to FIG. 1 the embodiment of the invention in FIG. 2 will likewise be in complete alignment, i.e. the parallelograms are very precise and will transfer the load from the cradles 51, 52 to the load cell 2.

Figure 3:
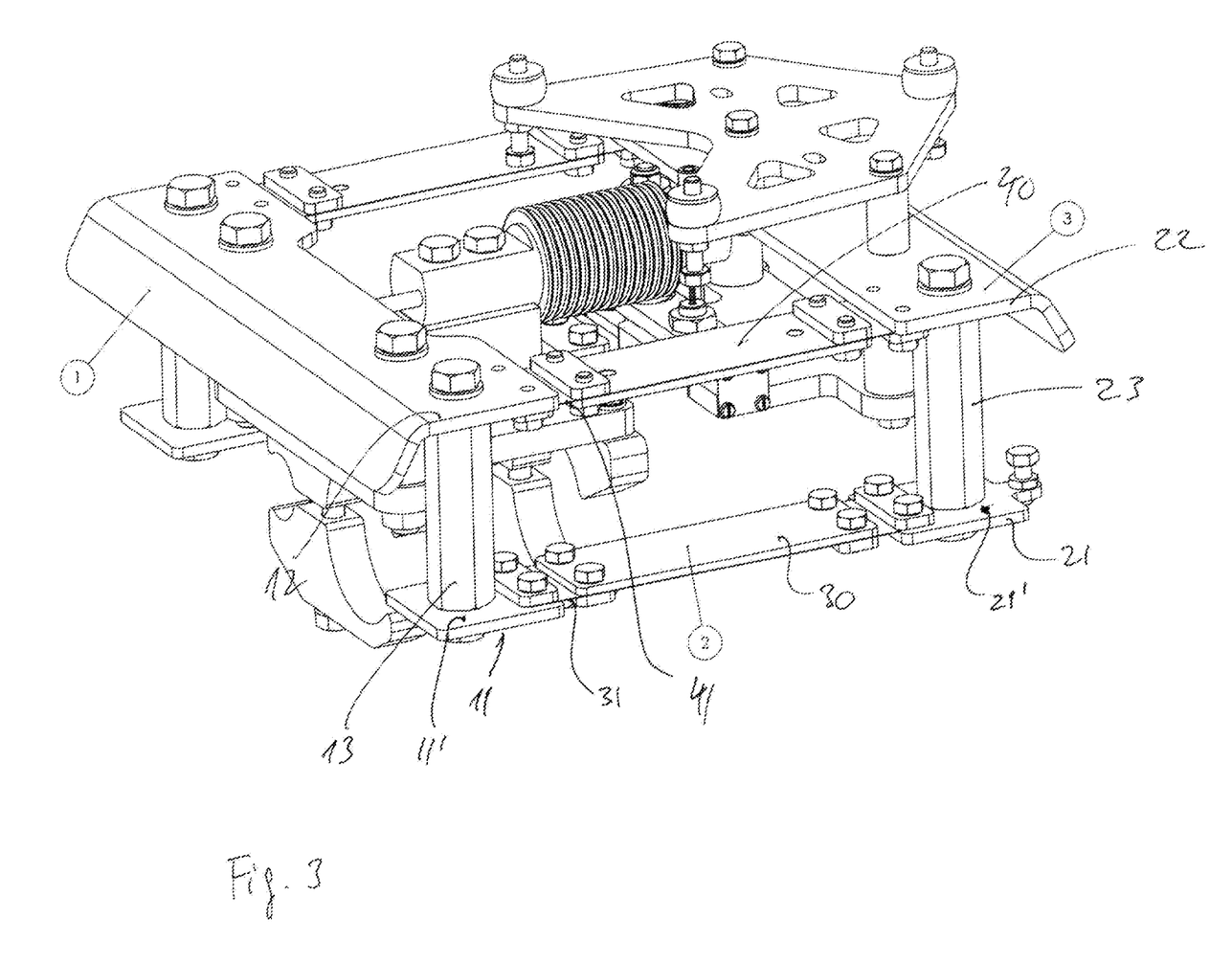
FIG. 3 illustrates an analogous weighing cell construction to FIGS. 1 and 2, with slight constructional changes.

In FIG. 3 is illustrated a completely analogous weighing cells as discussed above with reference to FIGS. 1 and 2. The difference in FIG. 3 is the way that the secondary members 30, 40 are fastened to the fastening lands 11, 12, 21, 22. The end of the primary members 13, 23 are provided with fastening lands 11, 12, 21, 22. By fastening the flexible part 31 of the second members 30, 40 on the same side of the fastening land 11, 12 as the primary member 13 any tolerances due to the plate thickness of the fastening land 11, 12, 21, 22 are avoided.

In this construction only the planeness of the surface 11', 12', 21', 22' is of importance as the flexible part 31, 41 of the second members 30, 40 is arranged in substantially the same plane as the ends of the primary members 13, 23.

Figure 4:
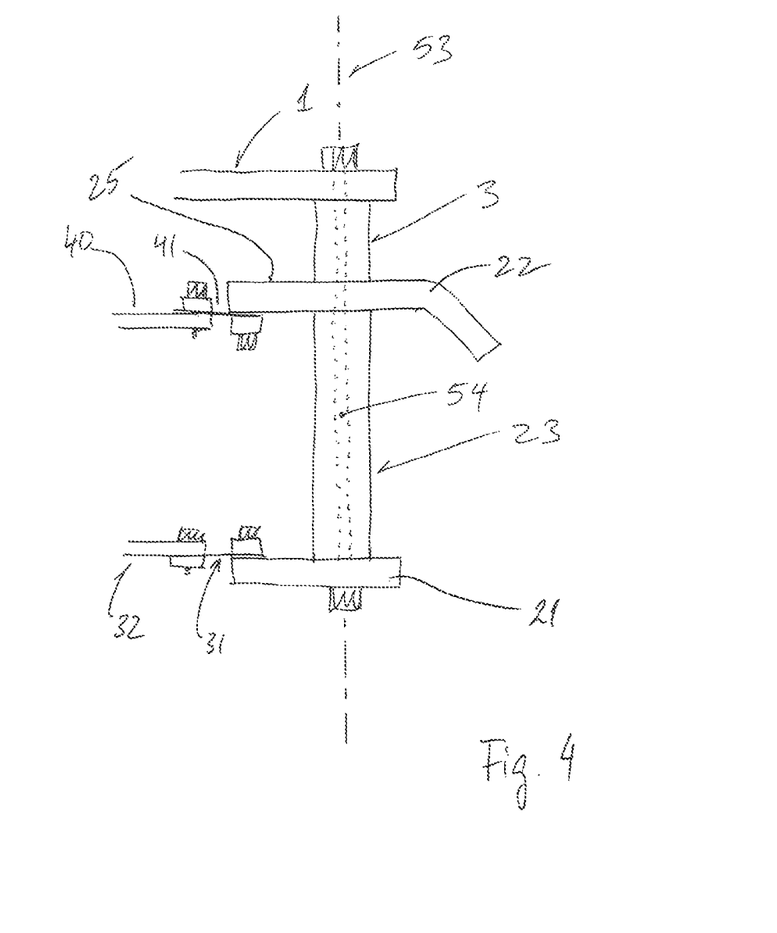
FIG. 4 illustrates a further advantageous embodiment wherein constructional details provide for improved accuracy.

In FIG. 4 is illustrated a suspension substantially corresponding to the suspensions already described above with reference to FIGS. 1-3. However, there are some differences in the configuration of this particular embodiment.

In FIG. 4 is illustrated a detail of assembly of a suspension according to the present invention. The suspension detail is of the movable part of the weighing cell and as such the weighing cell foundation 1 is mounted by means of legs 3 to the plate member 25.

In this embodiment the legs 3 are coaxial with axis 53 with the primary members 23 such that one long bolt illustrated by dashed lines 54 arranged coaxially with the axis 53 provides an assembly where the fastening lands 21, 22 are as in the other embodiments connected in either end to the primary member 23.

Further, the leg 3 from the weighing foundation is arranged coaxially with the primary member 23. In this manner a substantially simple, rigid and very precise assembly is possible for the various parts of the suspension.

Figure 5:
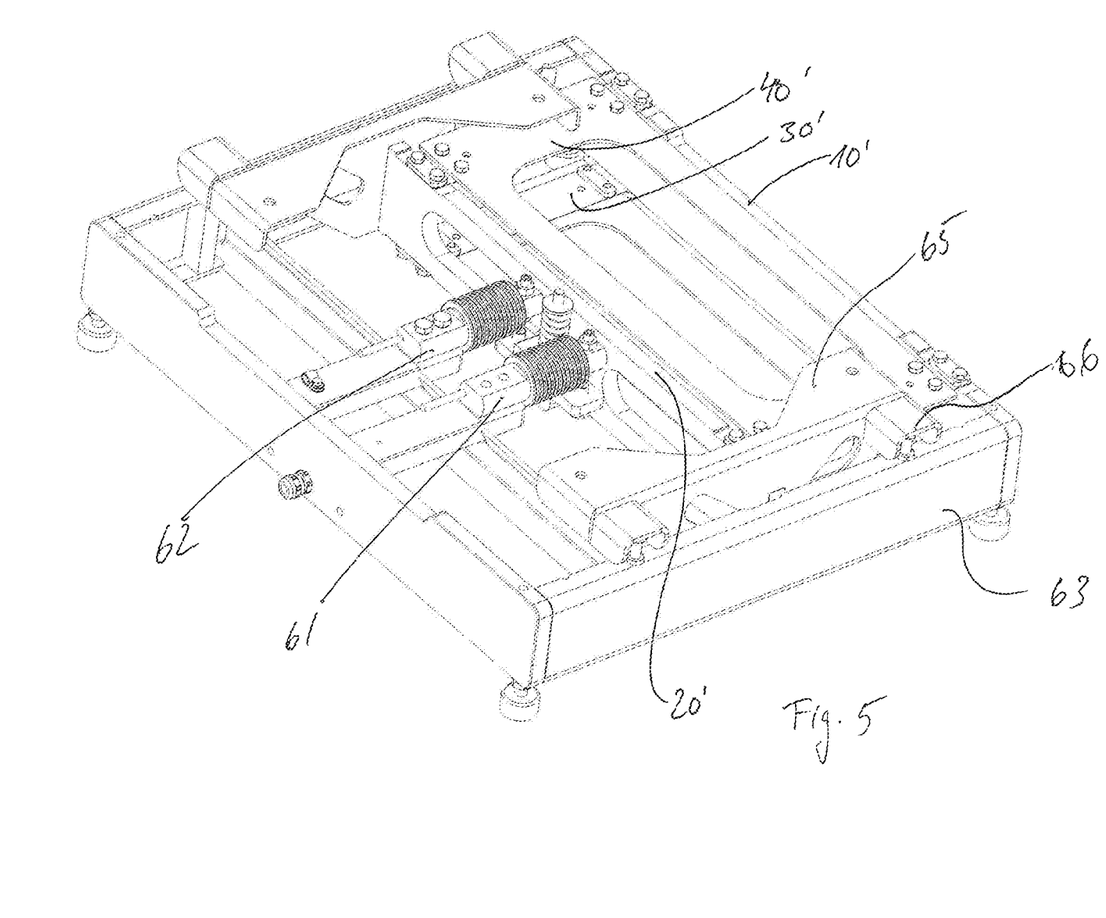
FIG. 5 illustrates a further improved and advantageous embodiment.

Furthermore, it is ensured that as many possibilities for tolerances are left out in that for example by arranging the legs 3 coaxially above the primary members 23 only tolerances in the plate thickness of the fastening land 22 being part of the plate member 25 does not affect the distances FIG. 5, illustrates a further embodiment of the invention where two load cells 61, 62 are arranged for registering the load put on the moveable part of the weighing cell. The construction of the weighing cell described above is similar to the embodiment depicted in FIG. 5. The base section 10' is part of a support structure 63. The support structure 63 is rigid box, suitable to be placed on a firm surface.

From the base section 10' secondary parallel elements 30', 40' connects to the movable part 20'.

As was the case with the embodiments described above the secondary parallel elements 30', 40' are connected to the movable part 20' respectively the base part 10' by flexible elements 31', 41'.

The two load cells 61, 62 are mounted on the base part 10' and connected to the moveable part 20'. By providing two load cells 61,62 it is possible to "average" the registered measurement, thereby to a certain extend compensate for irregularities arising from the parallelograms not moving exactly in unison. These irregularities may arise due to the fact that the objects to be weighed are placed on a conveyor connected to the movable part 20'. As the conveyor moves and thereby the objects pass the weighing cell and its suspension, small eccentricities may arise. By providing a double system, the measurements are improved.

The movable part 20' is furthermore provided with mounting means 65 for arranging the surface (not) illustrated on which objects to be weighed are placed. This surface may be a stationary surface onto which objects are placed, or may be a conveying structure, where objects pass on the conveyor, and are weighed as they pass the weighing cell.

In order not to overload the weighing cell stops 66 are provided. Said stops 66 limit the downward movement of the movable part 20'.

The invention claimed is:

1. Suspension for a weighing cell, where the suspension comprises a base structure and a moveable structure, and where a load cell is connected between said base structure and said moveable structure, where the suspension is generally shaped as a parallelogram, said parallelogram having two parallel primary elements, where one primary element is fastened to the base structure and the other primary element is fastened to the moveable structure, and where between the primary elements on respectively the base structure and the moveable structure, two, in a rest position parallel, secondary elements are arranged, where each secondary element is provided with at least one bendable section, said bendable sections having the same characteristics with respect to bending, and that the primary elements comprises a cylindrical section and a fastening land in either end of the cylindrical section for fastening an end of the secondary elements, wherein two parallelograms are provided, such that the secondary parallel elements of each parallelogram are parallel, and that the primary elements of the movable structure and the base structure are arranged on parallel lines orthogonal to said secondary parallel elements, and where the parallelograms are connected by at least one plate element.

2. Suspension according to claim 1 wherein the primary element comprises a solid or hollow cylinder, defined by two ends and a substantially constant cross-section there between, and where at each end a plate, is provided, where said plate has means for fastening said primary element to said secondary element.

3. Suspension according to claim 1 wherein the secondary element comprises a flexible element and optionally a stiffening element, fastened to the secondary element.

4. Suspension according to claim 3, wherein the flexible element is a leaf spring element.

5. Suspension according to claim 4 wherein the secondary element comprises two leaf spring elements, each leaf spring element fastened to respective primary elements in one end, and in the other end connected by a stiffening plate.

6. Suspension according to claim 1 wherein two parallelograms are provided, such that the secondary parallel elements of each parallelogram are parallel, and that the primary elements of the movable structure and the base structure are arranged on parallel lines orthogonal to said secondary parallel elements.

7. Suspension according to claim 1, wherein the suspension comprises two parallel parallelograms, where each parallelogram comprises two primary elements and two secondary elements, and where the primary elements on the moveable structure at least in one end of the primary element is connected by a common plate element, and where the primary elements on the base structure at least in one end is connected by a common plate element.

8. Suspension according to claim 1 wherein one or more of the plate elements or common plate elements are provided with a bend, around an axis parallel to a line between the two primary elements on the same structure such that an increased moment of resistance is provided against bending in the plate between the two parallelograms.

9. Suspension according to claim 5 wherein the load cell is arranged equidistant between the two parallelograms.

10. Suspension according to claim 1 wherein the distance between the upper surface and the lower surface of the moveable structure and the base structure is between 20 and 400 mm, more preferred between 50 mm and 120 mm.

11. Suspension according to claim 3 wherein the leaf spring element has a length spanning the distance between the two parallel primary elements, a width, and a thickness orthogonal to a plane defined by said length and width, where the thickness is in the range of 0.1 mm to 5 mm more preferred between 0.2 mm to 1.2 mm and most preferred 0.3 mm.

12. Suspension according to claim 1 wherein the primary elements (13, 13', 23, 23') are fastened to the fastening land (11,21) on the same side of the fastening land (11, 21) as the secondary elements (30, 30', 40, 40').

13. Suspension according to claim 1 wherein the weighing cell foundation (1) is mounted to the suspension by legs (3), and where at least one leg (3) or more preferred two legs (3) are coaxially arranged with respect to one or more primary elements (13, 23).

14. Suspension according to claim 13 where two legs (3) are coaxially arranged with respect to two primary elements (13, 23), where the primary elements (13, 23) are arranged on separate parallelograms.

* * * * *